US005745316A

United States Patent [19]
Schandl

[11] Patent Number: 5,745,316
[45] Date of Patent: Apr. 28, 1998

[54] PHASE DETECTOR FOR A RECORDER/PLAYER USING A CONDUCTING LOOP DRIVEN BY A WINDING STRAND OF THE HEAD DRUM MOTOR

[75] Inventor: Hartmut Schandl, Vienna, Austria

[73] Assignee: Deutsche Thomson Brandt GmbH, Germany

[21] Appl. No.: 447,595

[22] Filed: May 23, 1995

Related U.S. Application Data

[62] Division of Ser. No. 190,060, May 11, 1994.

[30] Foreign Application Priority Data

Sep. 20, 1991 [DE] Germany .................. 41 31 278.3

[51] Int. Cl.[6] ............................................. G11B 21/04
[52] U.S. Cl. .................... 360/70; 360/77.13; 360/137; 324/207.13
[58] Field of Search .................. 318/254; 360/73.11, 360/77.12, 77.13, 70, 137, 73.09, 75, 73.01; 324/202, 207.13, 207.11, 228

[56] References Cited

U.S. PATENT DOCUMENTS

| | | | |
|---|---|---|---|
| 3,670,113 | 6/1972 | Bragas | 360/75 X |
| 4,651,067 | 3/1987 | Ibo et al. | 318/254 |
| 4,930,025 | 5/1990 | Oberjatzas | 360/70 X |
| 5,142,208 | 8/1992 | Curran et al. | 318/254 |
| 5,193,146 | 3/1993 | Kohno | 318/599 X |
| 5,231,548 | 7/1993 | Yamada et al. | 360/70 |

*Primary Examiner*—Aristotelis M. Psitos
*Assistant Examiner*—Larry T. Cullen
*Attorney, Agent, or Firm*—Joseph S. Tripoli; Frederick A. Wein

[57] ABSTRACT

In an electronically commutated head drum motor in combination with a motor control circuit, commutation control and tacho signals are generated from the commutation of winding strands. One of the winding strands is used for the phase detection of the read/write heads arranged on the perimeter of the rotating head drum. A commutation signal is derived from the commutation of this winding strand and the commutation signal is set in relation to the reference signal of a signal track to be recorded or scanned.

5 Claims, 4 Drawing Sheets

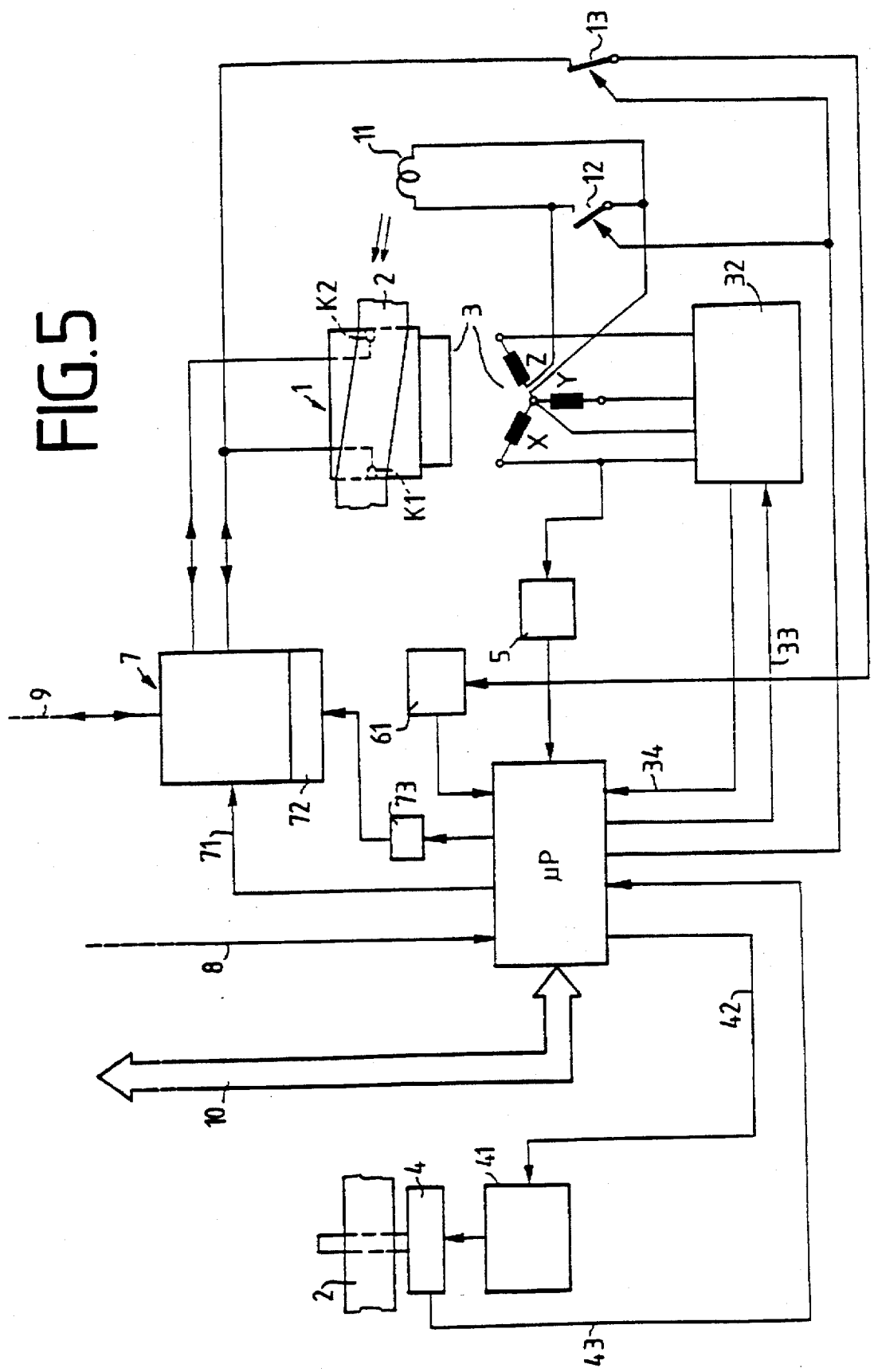

PHASE DETECTOR FOR A RECORDER/ PLAYER USING A CONDUCTING LOOP DRIVEN BY A WINDING STRAND OF THE HEAD DRUM MOTOR

This is a division of application Ser. No. 08/190,060, filed May 14, 1994 pending.

BACKGROUND

With commercially available recorders which have read/write heads, hereinafter called heads, arranged on the perimeter of a rotating head drum (cylinder) for recording and/or reproduction of signals according to the helical track method, such as with video recorders, it is known to utilize electronically commutable motors for driving the head drum and for the drive of a tape-type recording medium wound around the head drum. The motor driving the recording medium has a motor shaft formed as a capstan. The other motor forms, together with the head drum, one mechanical unit, whereby its motor shaft makes a phaselocked link between the motor rotor and the head wheel supporting the heads. Both motors are each a part of rotational speed and/or phase regulation loops which couple both drives together with the aid of a reference signal and produce, according to the respective recorder standard, optimum reference position conditions for the heads, signals to be recorded and/or signal tracks to be scanned.

Essential reference signals for a video recorder are the change-of-frame impulses to which all further auxiliary synchronizing signals generated in the recorder are aligned.

In the VHS standard it is laid down, for example, that the recording medium winds around a head drum with a first and a second read/write head by a little more than 180 degrees. Each read/write head which is in contact with the recording medium records or scans one field in one track within a contact length of 180 degrees whereby the first head is allocated to the first fields and the second head to the second fields respectively. Both head gaps have on both sides of the middle axis in a mirror image way an azimuth angle of approximately 6 degrees. The length of contact of approximately 7 degrees which extends beyond the 180 degrees is provided for the following lines of the next field so that an overlap zone of two neighboring tracks results. The position of this overlap zone is fixed as, on average, 6.5±1.5 lines before the appearance of a vertical synchronizing impulse. It is also the switching position for the switchover of the heads upon playback.

It is also known that in the recording mode the phase of the head drum drive is regulated, while the r.p.m. of the capstan drive is regulated. In the playback mode the reverse is true. It is normal to use microprocessors for such regulating procedures and for the control of both drives as determined by the mode of operation. To detect the phase position for the purpose of obtaining command and regulating variables for the phase regulation of one or the other drives respectively, at least one position indicator sensor is disposed in the vicinity of the head drum. The command variable for the phase regulation of both drives is obtained in a known way with the help of a reference tape and stored in the recorder so that compatibility with recorders of the same system and tapes not recorded on the device is created. The command variable can, in this case, also be stored in a microprocessor provided for regulating and controlling the drive, as is described, for example, in German patent P 35 28 452.8.

Integrated motor circuits (model designation TDA 514x) for the rotational speed regulation of electronically commutable motor for driving such head drums are known from the TECHNICAL PUBLICATION published by PHILIPS in 1990. The regulating variable required for regulating the rotational speed is derived from the tacho signals which are obtained from the commutation through detection and evaluation of the zero crossings of the countervoltages induced upon disconnecting the winding strands (phase windings). Furthermore, control signals, corresponding to the result of the evaluation, for the output amplifier stages working in the switching mode of these motor circuits are generated in these motor circuits to which the winding strands are connected. However, the accuracy of the motor drive is determined by the manufacturing tolerances of the winding strands and the rotor. Therefore, for high-precision motor drives in recording and playback devices, an additional phase regulation is made use of, derived from markings of the rotating parts.

At the present time, forked photoelectric barriers coupled with the rotor of the head drum motor or Hall elements or inductive magnetic sensors are usually used as position indicator sensors. Such position indicators are relatively expensive and apart from that, their arrangement requires manual activities.

It is therefore the object of the invention to reduce the effort for the phase detection of the rotating heads with a circuit arrangement for the phase regulation of head drum drive and/or tape drive with such a motor circuit.

The idea behind the invention is to create a relation between the rotating heads, signals to be recorded, signal tracks to be scanned and a reference signal, such as the change-of-frame impulse in a video recorder, with the help of the commutation cycles of the electronically commutable, stationary winding strands of the head drum motor, whereby command and regulating variables for a phase regulation of head drum drive and/or capstan drive can be derived from said reference in order to create the above-mentioned reference position conditions, according to the standard, for the rotating heads, signals to be recorded or signal tracks to be scanned.

Instead of a separate position indicator sensor, one of the winding strands of the head drum motor is, in principle, used for the phase detection of the head drum drive. In doing this, a signal, hereinafter called commutation signal, is derived from the commutation of the winding strand and said signal is set up in relation to the reference signal in order to obtain the command variable for the phase regulation of head drum drive and/or capstan drive from this. For this, the difference between the current rotor position and a zero phase position is measured which the rotor is to assume relative to the reference signal. Thereby, an unambiguous phase determination is guaranteed which not only takes into account the current rotor position but also the tolerances of the mechanical system of the motor. Thereby, the commutation signal detected by at least one winding strand can also be used in an advantageous way for the phase regulation of precision drives with a motor circuit like the TDA 514x mentioned.

The following facts and findings are exploited by the invention. A commutation is always carried out only at that place where the rotor, or rather its field magnets, exhibits a position which is favorable for the torque generation with the winding strands. However, the number of commutations per winding strand and rotor revolution, and thereby the frequency of occurence of such a commutation signal with reference to one rotor revolution and one winding strand, depends on how many poles a winding strand has or, respectively, how many individual coils, hereinafter called stator coils, are always wired together to form one winding strand. This means that certain phase positions of the rotor, and thereby several phase positions of the heads phase-locked coupled with the rotor, are allocated to the commutation signal derived from a winding strand.

The frequency of the appearance of such a commutation signal per rotor revolution leads to the problem of classifying, by means of such a commutation signal, the rotating heads, the signals to be recorded or the signal tracks to be scanned respectively according to the recorder standard.

The problem is solved by an initialization provided for the recorder which is always carried out at the start of each recording and playback operation. Doing this, the command variable for the combined operation of both drives specified by the recorder standard is determined from the commutation and reference signals respectively with the signals to be recorded or signal tracks to be scanned respectively.

With the initialization for the recording mode, according to the invention, with a stationary recording medium at first a modulated so-called initialization signal is fed to one of the rotating heads during a certain head drum swing angle; the signal track of said signal left behind on the recording medium will be read subsequently. The length of this signal track depends on which of the rotor positions detectable with the commutation signal at the start of the recording formed the zero phase with respect to the reference signal. The length of the signal track as well as its phase-wise position with respect to the reference signal can be evaluated by, for example, a microprocessor, in order to generate both the standard head/signal allocation through a corresponding phase regulation of the head drum drive, and also to determine the command variable for the combined operation of both drives with the signals to be recorded. In order to avoid that, upon scanning, a track remnant, for example, from another recording, which follows coincidentally the initialization signal track leads to an incorrect interpretation, the reading duration is limited in time.

Because the initialization signal feeding and reading duratio can be matched to the angle of tape contact on the head drum, the invention can be applied to differing tape contact angles.

In the recording mode, the difference between the current rotor position and the zero phase is always established just once at the start and can then be used as a constant command variable throughout the entire duration of recording.

For the initialization for the playback mode of the recorder, the existing recording is used because the head/signal allocation and the command variable can be obtained from its signal tracks. Determining the head/signal track allocation and determining the command variable are carried out here by detecting a complete signal track using one of the rotating heads. For recognizing, or rather detecting, a complete signal track, the tape is driven at a speed deviating from the normal playback speed during the initialization.

A rotor position with which the command variable is determined can also be determined with the aid of a simple conducting loop which can be a part of a feed line to the head drum motor, is disposed outside the area of the tape/head contact and, together with one of the rotating heads, forms a position indicator sensor. After detecting the rotor position and storing of the zero phase allocation of a corresponding commutation signal to the reference signal, the conducting loop can be switched off or short-circuited respectively.

BRIEF DESCRIPTION OF THE DRAWINGS

The invention will be explained in the following in the form of embodiment examples by means of the drawings. Therein is shown.

DETAILED DESCRIPTION OF THE PREFERRED EMBODIMENT

Figure 1:
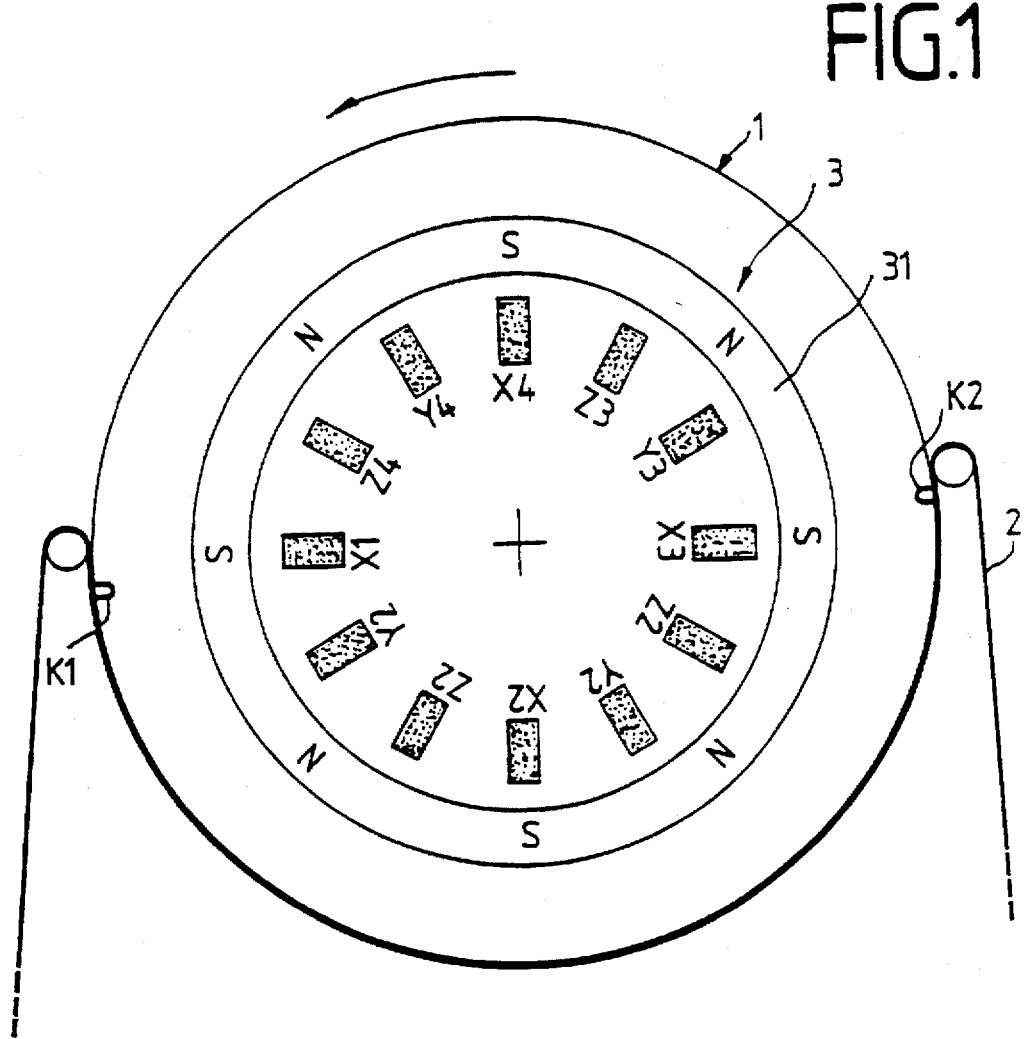
FIG. 1 a schematic representation of a head drum for a commercially available video recorder with an electronically commutable motor for driving the head drum, FIG. 2 a flow chart for the commutation sequence of a winding strand of the head drum motor according to FIG. 1, FIG. 3 a circuit arrangement for regulating head drum and tape drives in a first embodiment type of the invention, FIG. 4 flow charts of detectable rotor positions for the determination of the phase position of the read/write heads in the circuit arrangement according to FIG. 3, FIG. 5 a circuit arrangement according to FIG. 3 for regulating head drum and tape drives in a second embodiment type of the invention.

FIG. 1 shows, schematically, a rotating head drum 1 with two opposing read/write heads K1, K2 for the scanning or recording of signals in lawnless helical tracks of a tape-type recording medium 2, hereinafter called tape, which is wound around the head drum 1 by somewhat more than 180 degrees. The drive for head drum 1, or rather the head wheel carrying heads K1, K2, is performed here by a motor 3 which forms a mechanical unit with the head drum and preferably consists of a 12-pole stator and an 8-pole rotor 31. The direction of rotation of the head wheel coupled with the rotor 31 is indicated by the arrow.

Figure 3:
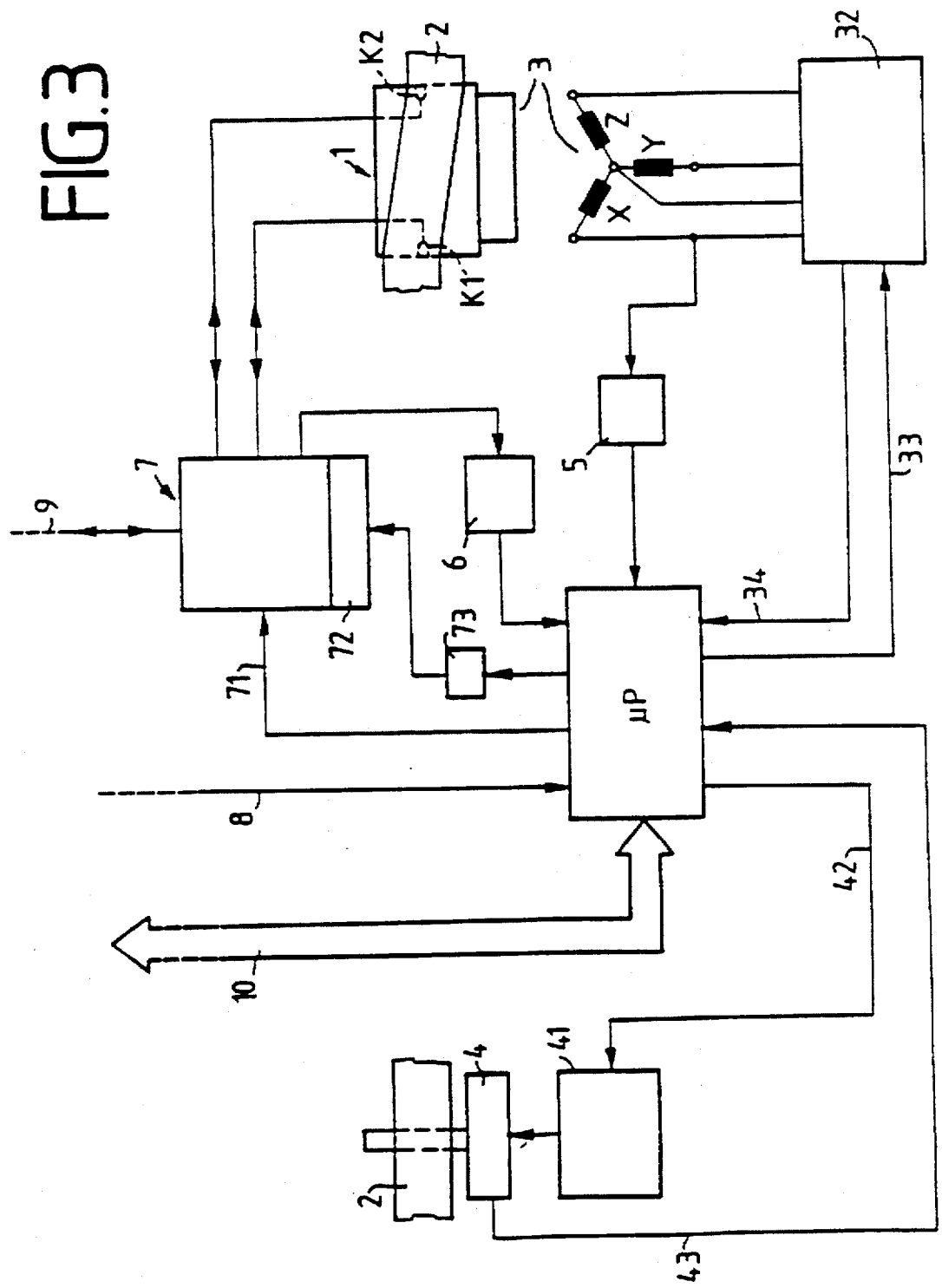

The rotor 31 is formed essentially by eight field magnets which rotate around 12 stator coils X1 through X4, Y1 through Y4, Z1 through Z4 arranged in a ring, whereby always one group of four stator coils X1 through X4, Y1 through Y4, Z1 through Z4 forms an electronically commutable winding strand X, Y, Z (FIGS. 3 and 5). The winding strands X, Y, Z are preferably wired in a star connection. The stator coils X1 through X4, Y1 through Y4, Z1 through Z2, and the magnetic poles north N and south S of the rotor are all arranged evenly distributed. However, the respective locational accuracy is determined by manufacturing tolerances.

The rotor position in the playback mode at which the head change-over mentioned takes place is indicated by the head K1 making contact with the tape loop.

Figure 2:
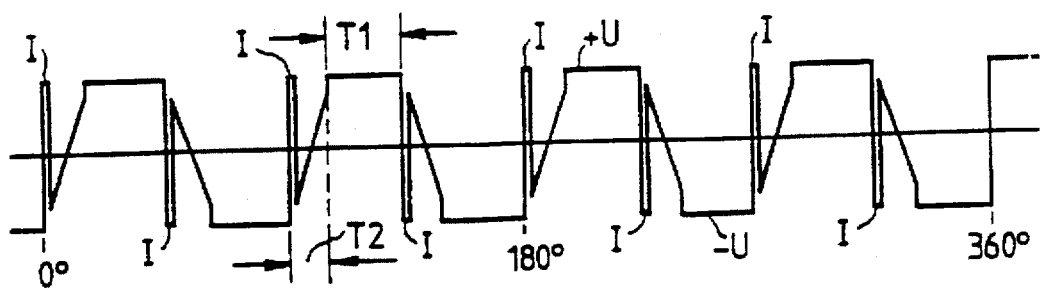

For obtaining command and regulating variables for the phase regulation of head drum and/or tape drives as well as a regulating variable for the creation of the standard head/signal or, respectively, head/signal track allocation with the aforementioned initialization of the circuit arrangement for the regulation of head drum and tape drives, one of the winding strands is used, according to the invention, for example, winding strand X as shown in FIG. 3 and FIG. 5 with the head drum motor 3. A pulse-shaped commutation signal 'I' is used as position indicator signal which appears at certain rotor positions as can be seen in FIG. 2 from the voltage progression at the winding strand X for one rotor revolution. The commutation sequence of winding strand X for one revolution of the rotor is illustrated in FIG. 2. The voltage progression is predetermined through the combination of motor 3 with a motor control circuit 31 of the type of motor circuit TDA 514x already mentioned. The respective switch-on (connected) periods T1 and switch-off (disconnected) periods T2 for winding strand X can be seen. The shape of the repetitive commutation signal 'I', alternating with respect to the reference line with positive and negative polarity, is caused by reverse current diodes integrated within the motor circuit 31 in that these diodes are switched through respectively by the reverse-electromotive force which is generated with the commutation-dependent disconnections of winding strand X by induction in the winding strand X. Each of the winding strands X, Y, Z is allocated two such reverse current diodes. For determining the rotor position for the standard head/signal or head/signal track allocation respectively, preferably only the commutation signals 'T' of one polarity are used. Such commutation signals 'T' are generated in each of the winding strands X, Y, Z.

The manipulated variable for the respective drive regulation of head drum 1 is determined using the value of the voltage +U or −U respectively, which is applied (added) to the winding strands X, Y, Z during their connected (switch-on) periods T1.

FIGS. 3 and 5 show, respectively, the principle of a circuit arrangement for regulating head drum and tape drives, whereby in FIG. 5, a second embodiment type of the invention is illustrated and the arrangement according to FIG. 1 as well as the diagram according to FIG. 2 are the basis of the further description.

FIG. 3 shows a block circuit diagram of a circuit arrangement for regulating of head drum and tape drive with the winding strand X used for the phase detection of heads K1, K2. The circuit arrangement essentially comprises the following electronic circuits: a motor control circuit 41 for a capstan motor 4 for driving the tape 2, a motor circuit of the type TDA 514x used as a motor control circuit 32 for the head drum motor 3, an impulse detector 5 connected with winding strand X and used for detecting the commutation signals 'T' of winding strand X, a detector circuit 6 which can be connected to head K1 for detecting the initialization signal, and a microprocessor up as well as a switching unit 7 containing a head change-over switch 72, which can be controled from microprocessor uP via flipflop 73, and also a switch for signal path switchings dependent on operating mode and initialization and controled by microprocessor uP via a multiwire line 71. A line 9 indicates connections of switching unit 7 with the recorder circuits, not illustrated, for processing the recording and playback signals. The microprocessor uP is connected via a databus 10 to the recorder's operating controls which are not illustrated. The microprocessor uP receives instructions via databus 10 and indicates their execution like, for example, that the initialization of the circuit arrangement has been completed.

The circuit arrangement is described in the following by means of the initializations for the recording and playback modes. The various regulation and control procedures described hereby for the head drum and tape drives are carried out by microprocessor uP through appropriate control of the motor control circuits 32, 41 via lines 33, 42.

Recording mode

With a stationary tape 2 and a head drum motor 3 adjusted to a desired rotational speed, microprocessor uP allocates a zero phase to a reference signal 20 (FIG. 4) of the video signal to be recorded to a random commutation signal 'T' with positive polarity, detected by impulse detector 5 and fed from the output of impulse detector 5 to microprocessor uP. The microprocessor uP derives the regulating variable for regulating the rotational speed of motor 3 from tacho signals which are fed to said microprocessor via a connection 34 and obtained using motor control circuit 32 in the manner mentioned above. The change-of-frame impulse of the video signal is used as reference signal 20 which is fed to microprocessor uP via a line 8. The zero phase is a command variable and exists as a time and/or phase difference, predetermined by the arrangement conditions, between the leading edge of the commutation signal 'T' and the leading edge of reference signal 20. The command variable is stored in the microprocessor uP.

Subsequently, an initialization signal 21 (FIG. 4) is only fed to head K1 via switching unit 7 for the duration of one-half of a head drum revolution. The video signal, or rather its frequency-converted recording signal is used as initialization signal 21. After a further half-revolution of the head drum, at the start of which feeding of the initialization signal is interrupted by means of switching unit 7 and at the end of which the same head is connected to the input of detector circuit 6 by means of switching unit 7, the signal track recorded with the initialization signal 21 is scanned using the same head K1. The signal 22 (FIG. 4) detected by the detector circuit 6 when doing this is fed to the microprocessor uP for evaluation. The duration of the connection between detector circuit 6 and head K1 is in this case also one-half of a head drum revolution, or rather rotor revolution, whereby the connection is also interrupted by means of switching unit 7.

The length of the detected signal 22, or rather the length of the signal track, and its phase-wise position relative to the reference signal 20 are a measure of at which rotor position the microprocessor uP had allocated the zero phase to the reference signal 20.

Figure 4:
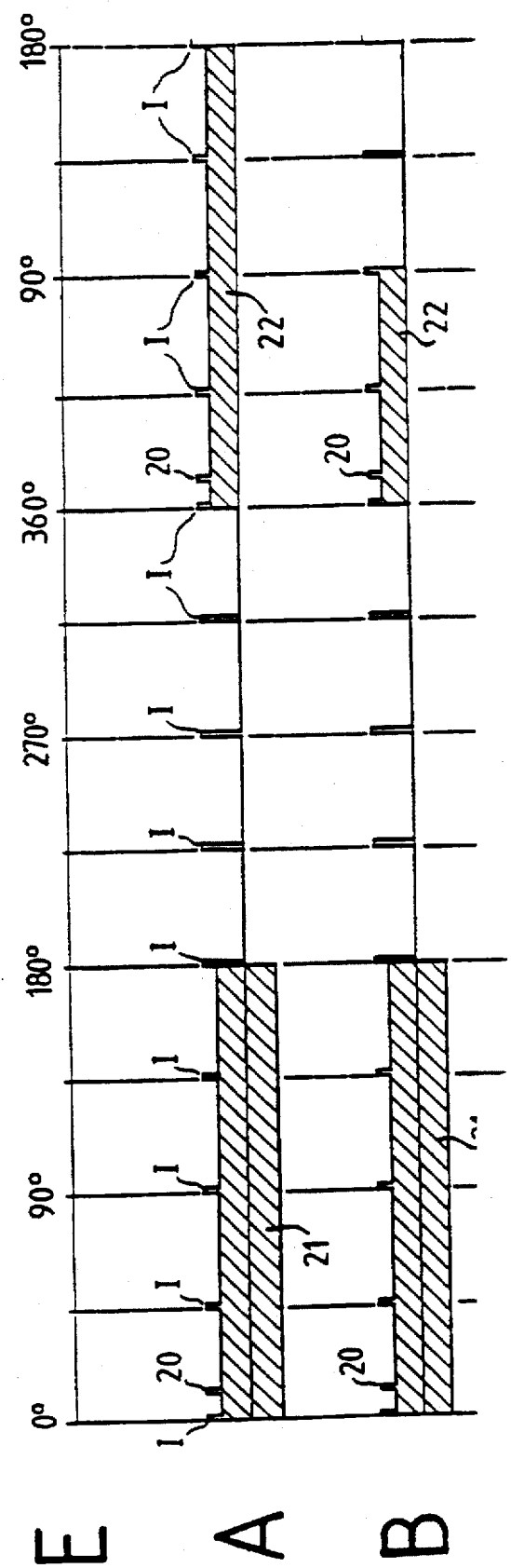

The relation between rotor position, length and position of signal 22 is illustrated by means of diagrams 'A' through 'D' in FIG. 4. Diagram 'A' shows the zero phase allocation of such a commutation signal 'T' to the reference signal 20 at the correct rotor position. Diagram 'B' shows the zero phase allocation at a rotor position of 90 degrees advanced. Diagram 'C' shows the zero phase allocation at a rotor position of 90 degrees retarded. Diagram 'D' shows the zero phase allocation at a rotor position of 180 degrees with which signal 21 cannot be recorded and, consequently, cannot be scanned. The scale E corresponds to one-and-a-half revolutions of the rotor.

The microprocessor uP evaluates the length of the detected signal 22 and its phase-wise position relative to the reference signal 20 and, with an evaluation result corresponding to one of the diagrams B, C or D, allocates the zero phase relative to the reference signal 20 to a corresponding commutation signal 'T'. In doing this the correct rotor position for the recording mode is created by a phase regulation of the head drum drive. At the same time, the tape drive is switched on and, through appropriate triggering of switching unit 7, the signal paths in switching unit 7 for normal recording operation are created and the recording begins. Thereby, the tape 2 is driven at a constant speed. The regulating variable for the tape drive is obtained by the microprocessor uP from tacho signals of the capstan motor 4. The tacho signals are fed to the microprocessor uP via a line 43.

Playback mode

With the initialization for the playback mode, the prerecorded tape 2 is driven at a speed which deviates from the normal speed for the playback mode, for example, 0.8 to 0.9 times the normal speed, so that in the most unfavorable situation the head K1 can pick up completely a signal track allocated to it during a few revolutions of the rotor, something that is recognized by the microprocessor uP with the help of detector circuit 6. Hereby, the input of detector circuit 6 is permanently connected via switching unit 7 to head K1. As the signal track can only be fully detected at a corresponding head/signal track allocation, and hence only at a correct rotor position, as soon as the signal track has been fully detected the zero phase relative to the reference signal 20 of the prerecorded tape 2 is allocated to the appropriate commutation signal 'T', taking into account the deviating tape drive speed, and switchover to play mode occurs. Switchover sequence and switchover time for the half-wise switchover of heads K1, K2 are also determined using this commutation signal 'T' and the signal paths in switching unit 7 are created for the playback mode through corresponding triggering of switching unit 7. The switching signals for head change-over switch 72 required here for the playback mode are generated with the help of the flipflop 73 controled by microprocessor uP. The allocation of said switching signals to this commutation signal 'T' is determined by delay times stored in the microprocessor uP resulting with alignment of the recorder, for example, with the aid of a tape 2 which contains signals recorded according to the standard. The flipflop 73 can be integrated into the microprocessor uP.

The envelope detector already present in the recorder for special operating modes like, for example, still picture, is utilized as a detector circuit 6.

The impulse detector 5 can be integrated into the motor control circuit 32.

The head 1 and the winding strand X making available the respective commutation signal ('T') therefore form a position indicator sensor with which corresponding phase positions of the heads K1, K2 can be detected.

As already mentioned, the invention is in no way limited to recorders in which the tape contact angle of the recording medium is 180 degrees. With recorders with other contact angles, for example, 270 degrees, the procedure may be executed accordingly.

FIG. 5 shows a circuit arrangement according to FIG. 3 with a conducting loop 11 which is disposed in a fixed position outside the tape/head contact region on the stationary part of the rotating head drum 1 and which can be preferably wired in series with one of the winding strands X, Y, Z with a switch 12 controled by microprocessor uP. It represents a second embodiment type of the invention.

The determination of the rotor position, with which the command variable is determined, in that the leading edge of the appropriate commutation signal 'T' is allocated to the reference signal, is carried out in this circuit arrangement using a magnetic field which is generated with the conducting loop 11 and can be detected at a corresponding rotor position with, for example, rotating head K1. For this the conducting loop 11 is switched on so that the current of the, for example, winding strand Z provided for this, can flow through said loop and can, thereby, generate the magnetic field which induces a voltage in head K1 which is then fed to the microprocessor uP for the determination of the rotor position. The feeding is preferably performed here via a threshold value detector 61 which is connected to head K1 via a switch 13 controled by microprocessor uP. After detection of the rotor position and storing of the zero pase allocation of a corresponding commutation signal 'T' relative to the reference signal 20, the connection between the input of threshold value detector 61 and head K1 can be broken and the current in the conducting loop 11 switched off. The threshold value detector 61 can be, for example, an operational amplifier functioning as a comparator.

Therefore, in this circuit arrangement the conductor loop 11 and head 1 form a position indicator sensor with which the phase position of the heads K1, K2 can be detected.

The switching-on and switching-off of the current in the conductor loop 11, and the connection of threshold value detector 61 with head K1 can each be carried out depending on the motor current, for example, only in the revving-up phase of the motor 3. The detection of the rotor position also happens during this time.

The switches 12, 13 and the threshold value detector 61 can be integrated into the motor control circuit 32. The conductor loop 11 can be designed as a part of the motor feed line and stuck (glued) to the outside of the stationary part of head drum 1.

The conductor loop 11 can also be designed as a part of the neutral conductor which can be switched on and off and which connects the star point of winding strands X, Y, Z with the motor control circuit 32.

The invention is especially suitable for video recorders and camcorders.

The invention is not limited to motors, the winding strands of which form a Y (star) connection.

I claim:

1. A recorder/player comprising:
   a rotating head drum for recording and playing back signals in the helical tracks of a tape-type recording medium which can be driven by a capstan motor according to a helical scan method,
   a motor directly driving the head drum,
   the motor having winding strands which are electronically commutated,
   a circuit arrangement for the phase regulation of one of the head drum and tape driving mechanism using a motor control circuit coupled to the winding strands,
   said motor control circuit comprising:
      means for generating control signals for the commutation of the winding strands derived from commutation signals which are created through induction at a commutation-dependent phase winding circuit for generation of motor torque signals in the winding strands,
      phase detection means for the read/write heads being located on the perimeter of the rotating head,
      a position indicator sensor provided for obtaining command and regulating variables for the phase regulation of one of the head drum and tape driving mechanisms,
      said position indicator sensor further determining a commutation signal from which a microprocessor derives command and regulating variables for the phase regulation of one of the head drum and tape driving mechanism, the position sensor being formed by one of the rotating read/write heads and a conducting loop fed with current derived from one of the winding strands thereby causing a magnetic field to be generated, whereby said conducting loop is disposed in a fixed position outside the region of tape/head contact on the stationary part of the head drum.

2. The recorder/player according to claim 1, wherein the position indicator sensor is a position indicator sensor with which the phase detection is already performed in the revving-up phase of the head drum motor.

3. The recorder/player according to claim 1, wherein the conducting loop is a part of the motor feed line and is secured to the outside of the stationary part of the head drum.

4. The recorder/player according to claim 1, wherein a switch is arranged for switching off the flow of current in the conductor loop after a phase detection and storing of a zero phase allocation of a commutation signal to the reference signal.

5. The recorder/player according to claim 4, wherein the switch for switching off the flow of current in the conductor loop used for the phase detection of the read/write heads is a controllable switch coupled in series with one of the winding strands and coupled in parallel with the conducting loop.

* * * * *